Mar. 3, 1925.
H. J. DANIEL
1,528,009
PROCESS AND APPARATUS FOR ELIMINATING ONION SEEDS FROM GRAIN
Filed Jan. 10, 1923    2 Sheets-Sheet 1
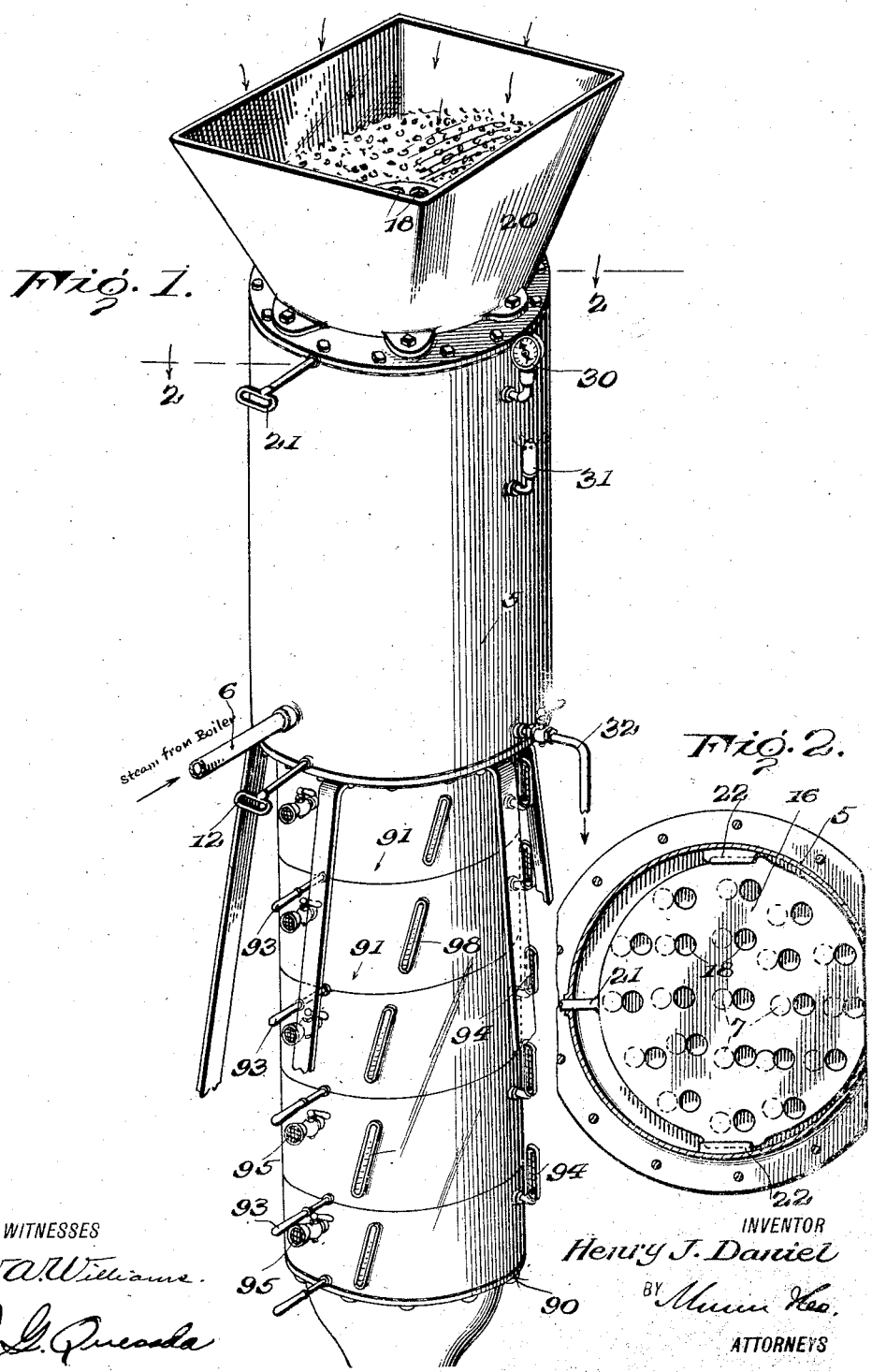

Mar. 3, 1925.
H. J. DANIEL
1,528,009
PROCESS AND APPARATUS FOR ELIMINATING ONION SEEDS FROM GRAIN
Filed Jan. 10, 1923     2 Sheets-Sheet 2
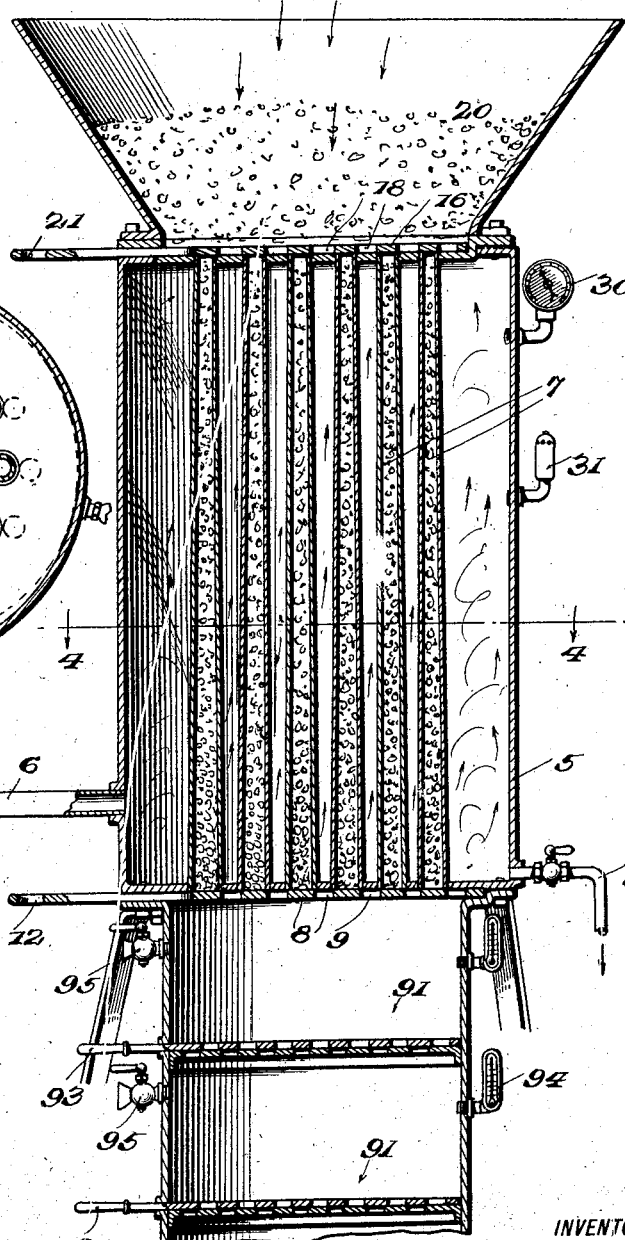
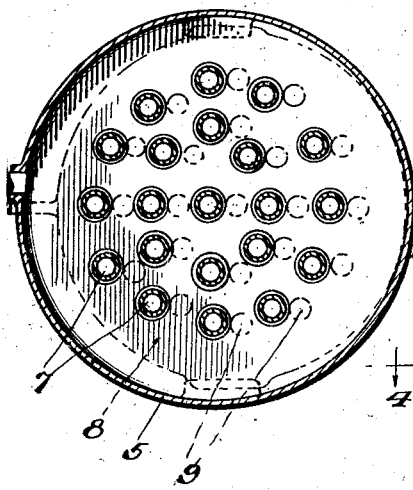
WITNESSES
INVENTOR
Henry J. Daniel
BY
ATTORNEYS Patented Mar. 3, 1925.

1,528,009

UNITED STATES PATENT OFFICE.

HENRY J. DANIEL, OF SUTHERLIN, VIRGINIA.

PROCESS AND APPARATUS FOR ELIMINATING ONION SEEDS FROM GRAIN.

Application filed January 10, 1923. Serial No. 611,798.

*To all whom it may concern:*

Be it known that I, HENRY J. DANIEL, a citizen of the United States, and resident of Sutherlin, in the county of Pittsylvania and State of Virginia, have invented certain new and useful Improvements in Processes and Apparatus for Eliminating Onion Seeds from Grain, of which the following is a specification.

This invention relates to an apparatus and process for separating onion seeds from grain, such as wheat, barley and oats.

In highly cultivated agricultural districts onions grow along with the grain and when the grain is thrashed the onions are also thrashed and ordinarily remain with the grain during the cleaning and grinding process. The presence of onion seed in the grain is very undesirable for the reason that during the grinding of the grain the onion seeds are cracked and the sap mixes with the flour and forms a dough, which is heavily coated about the grinding rollers. This coating of dough about the rollers chokes the mill and can be removed only by stopping the mill and scraping the rollers, all of which hinders the production and is very undesirable.

Furthermore the presence of the onion seeds in the grain gives the flour a very undesirable taste and consequently renders the flour less saleable.

Therefore an important object of this invention is to effectively remove onion seeds from the grain prior to grinding of the grain whereby the flour will not be coated on the rollers and will be entirely free of the previously mentioned undesirable taste.

A further object is to provide simple and reliable means whereby the process may be carried out without in any way lowering the quality of the grain and which will in fact dry the grain and thereby prepare the same for grinding and shipping.

In carrying out the invention the grain containing the onion seeds is subjected to the action of steam heat for a predetermined period with the result that the onions are rendered chaff-like, very light and lifeless so that when the grain is subsequently passed through a cleaner the action of the blower will effectively separate the onions from the grain and thereby increase the sale value of the grain 15 or 20%.

Other objects and advantages will be apparent during the course of the following description.

In the accompanying drawing forming a part of this application, and in which like numerals are employed to designate like parts throughout the same, Figure 1 is a perspective of an apparatus constructed in accordance with this invention.

Figure 2 is a horizontal sectional view throught the same.

Figure 3 is a vertical sectional view through the apparatus.

Figure 4 is a horizontal sectional view taken on line 4—4 of Figure 3.

In the drawing wherein for the purpose of illustration is shown a preferred embodiment of the invention the numeral 5 generally designates a cylinder having communication with a steam supply pipe 6 and by reference to Figure 3 it will be observed that a plurality of grain containing flues 7 are extended longitudinally through the cylinder or seed container 5. In carrying out the invention the grain is confined in the flues 7 for the desired period by means of a slide valve 8 having a plurality of openings 9 which may be brought into registration with the discharge end of the flues. However, during the treatment of the grain the openings 9 in the slide valves 8 are positioned out of registration with the flues 7 so as to prevent the discharge of the grain.

When the grain in the flues 7 have been presented to the action of the steam heat for the desired period the slide valves 8 may be manually moved by means of the handle 12 and the contents of the several flues discharged. It will be observed that the several flues 7 are gradually increased in diameter toward their lower ends so that when the valve 8 is moved to its open position the grain will drop away from the walls of the flues quickly.

Attention is directed to Figures 2 and 3 which illustrates an inlet valve 16 slidable over the upper ends of the flues 7 and having a plurality of openings 18 adapted for communication with the inlet ends of the several flues.

When the openings 18 are in registration with the several flues 7 the grain may enter the flues from the hopper 20 and when the openings are out of registration with the flues 7 the supply of grain to the several flues is prevented. A slide valve 16 is provided with a handle or gripping member 21 by means of which the valve may be operated or adjusted. Figure 2 illustrates that the cylinder is provided with a pair of inwardly directed guide flanges 22 which overhang the valve 16.

In Figure 1 it is illustrated that the cylinder 5 is provided with a pressure gauge 30, a safety valve 31 and a drain pipe 32 by means of which the condensed steam may be returned to the boiler or into a receptacle provided for the purpose.

In operation the grain containing the onion seeds is passed into the hopper 20 and the valve 16 is positioned so that the grain and onion seeds therein may enter the several flues 7. The valve 8 of course is arranged in closed position so that the premature discharge of grain is prevented. As the several flues are entirely surrounded by the steam which as known is maintained at a definite temperature, the heat of the steam will penetrate the flues and thereby sterilize the onion seeds. However the steam heat will not scorch the grain and will in fact dry the grain and condition the same for subsequent grinding and shipping.

It is important to note that the action of the steam heat on the onion seeds contained in the grain sterilizes the seeds, renders the same light, chaff-like and lifeless so that when the grain containing the onion seeds is subsequently passed through a cleaner the action of the blower will thoroughly and absolutely separate the onion seeds from the grain. As a result of experiment with this invention it has been found that the onions by being rendered much lighter may be carried off with the chaff by the blower and consequently the grain is supplied to the grinder at a later period entirely free from onion seeds.

Also it has been found that the action of the steam heat on the grain will not scorch the grain and as previously stated the quality of the grain is not in any way lowered.

After the grain has been passed through the cleaner in the old and well known manner and the onions removed therefrom in a chaff-like state the grain is milled and as the grain is free from the onion seeds the milling operation may be expeditiously and economically performed. The rollers are not coated and consequently it is not necessary to periodically stop the mill for the purpose of scraping the rollers.

It might be stated that millers are very much opposed to grinding wheat containing onion seeds as this cannot be profitably done for the reasons previously mentioned. Therefore the grain containing the onion seeds is in many cases supplied to cattle.

Grain milled in the absence of onions is, of course, free of the undesirable taste of onions and commands a good price on the market.

As illustrated in Figures 1 and 3 the grain is discharged into a supplemental heater generally designated by the numeral 90 and which includes a plurality of compartments 91, each one of which is of a capacity equal to the capacity of all the flues. When the material is discharged from the flues 7, it enters the uppermost compartment 91 and is retained therein for the desired period so as to continue the heating process by means of which the onions are thoroughly treated and rendered chaff-like. When the prolonged heating process has been completed in the uppermost compartment, a valve 93 is operated so as to discharge the material into the next compartment. It is understood, of course, that the valve 93 in the bottom of the next compartment is closed so that the material will not fall through the several compartments accidentally. The material is gradually passed through the several compartments 91 and the heat contained therein continues the heating or cooking process of the onions to produce the previously mentioned advantage.

The several compartments are provided with indicators 94 and with air valves 95 to prevent the formation of a vacuum in any one of the compartments as the material passes through the same. Also each compartment is provided with a sight opening 98 by means of which may be conveniently ascertained the quantity of material in the several compartments.

It is to be understood that the form of the invention herewith shown and described is to be taken as a preferred example of the same and that such minor changes in arrangement and construction of parts may be made as will remain within the spirit of the invention and the scope of what is claimed.

Having thus described the invention, what is claimed is:—

1. An apparatus of the character specified comprising a cylinder adapted for the reception of steam, a plurality of flues extending vertically through the cylinder and adapted for the reception of onion seed containing grain, a supplemental heating chamber secured to the lower portion of the cylinder and having a plurality of compartments, each one of which is equal to the capacity of all the flues, and valves controlling communication between the several compartments.

2. An apparatus of the character specified comprising a cylinder adapted for the reception of steam, a plurality of flues extending vertically through the cylinder and adapted for the reception of onion seed containing grain, a supplemental heating chamber secured to the lower portion of the cylinder and having a plurality of compartments, each one of which is equal to the capacity of all the flues, and valves controlling communication between the several compartments, a heat register for each of the compartments, and air inlet and exhaust means for the several compartments.

HENRY J. DANIEL.